United States Patent
Lebret

(10) Patent No.: US 6,775,980 B2
(45) Date of Patent: Aug. 17, 2004

(54) HYDRAULIC MASTER CYLINDER WITH CONCEALED DEAD TRAVEL

(75) Inventor: Pierre Lebret, Versailles (FR)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 10/373,466

(22) Filed: Feb. 24, 2003

(65) Prior Publication Data

US 2003/0159439 A1 Aug. 28, 2003

(30) Foreign Application Priority Data

Feb. 25, 2002 (FR) .............................. 02 02446

(51) Int. Cl.$^7$ .................... B60T 11/20; B60T 11/28
(52) U.S. Cl. ............................ 60/588; 60/589
(58) Field of Search ............... 60/533, 562, 585, 60/586, 588, 589

(56) References Cited

U.S. PATENT DOCUMENTS

| | | | | |
|---|---|---|---|---|
| 5,161,375 A | * | 11/1992 | Crumb et al. ............ | 60/589 |
| 5,179,834 A | * | 1/1993 | Rauschenbach ............ | 60/589 |
| 5,448,888 A | * | 9/1995 | Castel ........................ | 60/562 |
| 5,946,914 A | * | 9/1999 | Crumb et al. .............. | 60/585 |
| 6,065,292 A | * | 5/2000 | Unterberg ................... | 60/589 |
| 6,494,040 B2 | * | 12/2002 | Pagot et al. ............... | 60/589 |

* cited by examiner

*Primary Examiner*—Thomas E. Lazo
(74) *Attorney, Agent, or Firm*—Leo H. McCormick, Jr.; Warren Comstock

(57) ABSTRACT

Hydraulic master cylinder for a motor vehicle braking circuit, comprising means for concealing the dead travel of the primary (16) and secondary (44) pistons, these concealing means consisting of additional valve shutters (80) borne by the valve shutters (26, 56) that shut off the axial passages (22, 58) formed in the primary (16) and secondary (44) pistons, these additional valve shutters allowing the pressure in the primary (18) and secondary (52) chambers to increase right from the start of movement of said pistons over their dead travels.

9 Claims, 1 Drawing Sheet

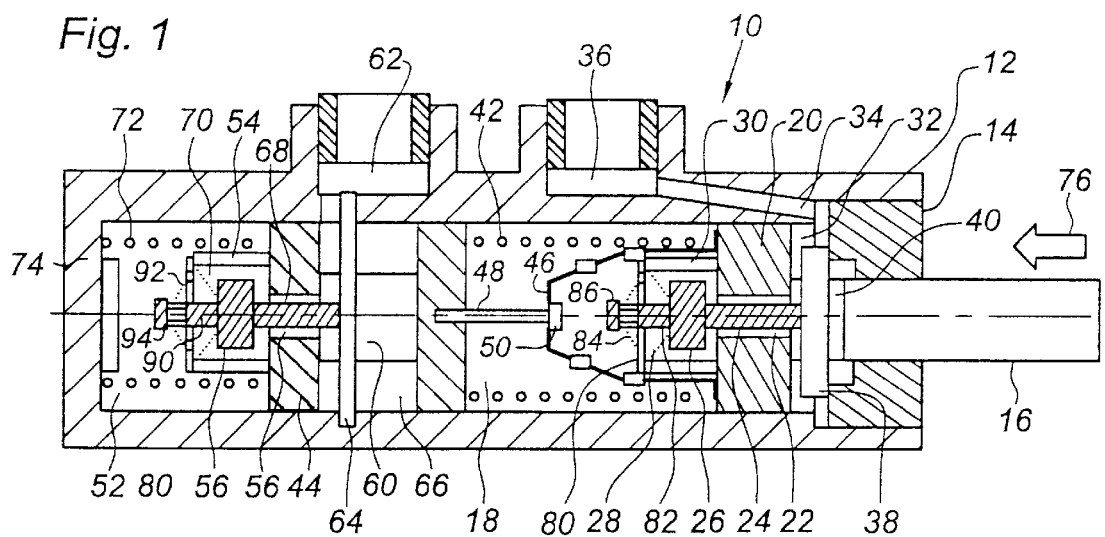
Fig. 1
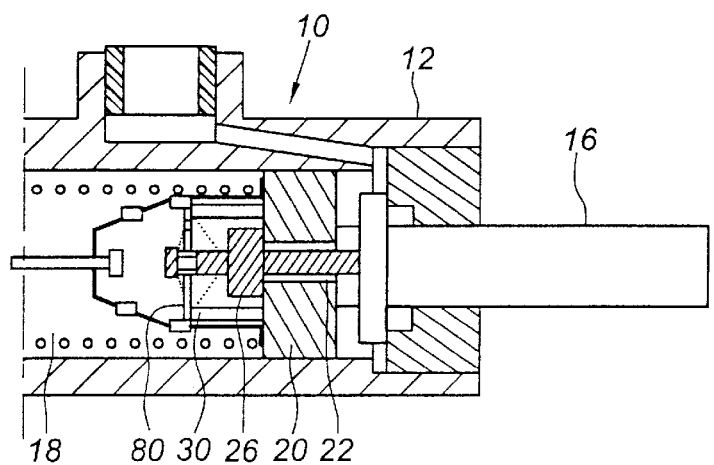
Fig. 2
Fig. 3
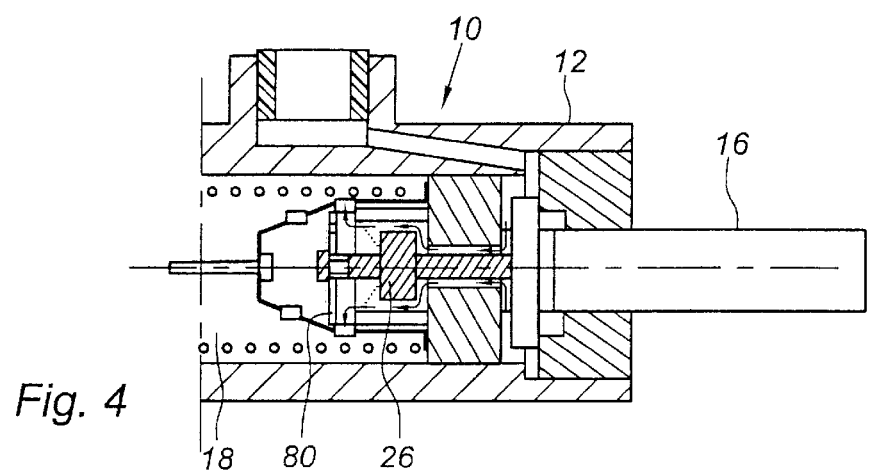
Fig. 4

HYDRAULIC MASTER CYLINDER WITH CONCEALED DEAD TRAVEL

The present invention relates to a hydraulic master cylinder for a motor vehicle braking circuit.

The master cylinder of a motor vehicle braking circuit is supplied with hydraulic fluid (brake fluid) from a reservoir and is controlled from the brake pedal to supply hydraulic fluid under pressure to the means for applying the brakes on the wheels of the vehicle.

Typically, the master cylinder comprises a piston (the primary piston in the case of a tandem master cylinder) which can be moved axially in a working chamber (primary chamber) by boost means operated by the brake pedal, and comprises an axial passage for communication between the working chamber and a supply chamber connected to the aforesaid reservoir. A valve shutter urged by a spring is borne by the piston to close the end of this passage which opens into the working chamber once the piston has covered a dead travel starting from its position of rest.

The closing of this passage by the valve shutter makes it possible, with the piston travel continuing, to cause the pressure in the working chamber to rise so as to actuate the means that apply the brakes. After a braking action, the master cylinder piston is returned to its position of rest and the valve shutter re-opens the communication between the working chamber and the supply chamber connected to the reservoir.

The opening of the valve shutter may also be brought about by a depression in the working chamber, this depression resulting from the operation of a circuit of the ESP (Electronic Stability Program) type which selectively operates the brakes, this circuit comprising at least one pump supplied with hydraulic fluid by the outlet from the master cylinder.

A tandem master cylinder comprises a secondary chamber for supplying pressurized fluid to a secondary braking circuit and a secondary piston which can be moved in the secondary chamber in response to the movement of the primary piston in the primary chamber or aforesaid working chamber. Like the primary piston, the secondary piston has a passage for communication between the secondary chamber and a fluid supply chamber, and a valve shutter urged by a spring is borne by the secondary piston to close off this passage for braking, once the secondary piston has covered a dead travel starting from its position of rest.

Attempts have already been made at reducing and controlling the dead travels of master cylinder pistons, because these dead travels delay the onset of braking and vary with manufacturing and assembly tolerances. However, to do this, measurement and adjustments have to be made for each individual master cylinder, and this is relatively lengthy and expensive.

It is a particular object of the present invention to avoid these disadvantages of the prior art.

The invention for this purpose proposes a hydraulic master cylinder for a motor vehicle braking circuit, comprising at least one piston that can move axially in a working chamber and is formed with an axial passage for communication between said working chamber and a brake fluid supply chamber, and a valve shutter urged by a spring to close said passage when the piston has covered a dead travel in the working chamber starting from a position of rest, characterized in that it comprises means of concealing the aforesaid dead travel making it possible to reduce the flow of fluid through the aforesaid axial passage so as to increase the pressure in the working chamber during the dead travel of the piston, these means being borne by the valve shutter.

The invention therefore makes it possible to conceal the dead travel of the piston by causing the increase in pressure in the working chamber to begin as soon as the piston starts to move, before the end of its dead travel, this having the advantage of not delaying the onset of braking without in any way interfering with the other stages of operation of the master cylinder.

In a preferred embodiment of the invention, the means of concealing the dead travel comprise an additional valve shutter urged by a spring to close an end duct in the piston in which the aforesaid passage opens, this additional valve shutter comprising means allowing a reduced flow of fluid in said passage and said duct when the additional valve shutter is in its position for closing the duct.

Advantageously, these means allowing reduced flow of fluid are formed by at least one orifice passing through the additional valve shutter.

Such a valve shutter preferably consists of a washer which is mounted so that it can move axially on an axial rod secured to the first valve shutter and which is made of a rigid material such as metal or a plastic resistant to brake fluid.

The means of concealing the dead travel of the master cylinder piston according to the invention are therefore of simple structure, easy to install and inexpensive. Fitting them requires no measurements to be taken beforehand on the master cylinder and their operation is not dependent on manufacturing and assembly tolerances.

In the case of a tandem master cylinder comprising primary and secondary pistons which are able to move respectively in primary and secondary chambers to supply primary and secondary braking circuits, with valve shutters borne by the primary and secondary pistons and urged by springs to close passages in these pistons which connect the primary and secondary chambers respectively to brake fluid supply chambers, means for concealing the dead travels of the primary and secondary pistons are provided to reduce the flows of fluid through the passages in the primary and secondary pistons and to increase the pressure in the primary and secondary chambers during these dead travels, these means being borne by the pistons and consisting of additional valve shutters of the same type as the one described hereinabove.

Advantageously, the valve shutters of the primary and secondary pistons of the master cylinder are identical and, likewise, the additional valve shutters of the concealment means are identical.

The invention will be better understood and other features, details and advantages thereof will become more clearly apparent from reading the description which follows, given by way of example with reference to the appended drawings in which:

FIG. 1 is a schematic view in axial section of a tandem master cylinder according to the invention;

FIG. 2 is a front view of an additional valve shutter according to the invention;

FIG. 3 is a part view in axial section of the master cylinder, depicting the primary piston in a forward position; and FIG. 4 is a view similar to FIG. 3, depicting the primary piston in a position of rest and the additional valve shutter open because of suction into the primary chamber.

By convention, in the description which follows, items to the left in the drawings will be said to be at the front and those to the right will be said to be at the rear.

The tandem master cylinder 10 depicted schematically in FIG. 1 comprises a cylindrical body 12 the rear end of which is closed by a circular wall 14 through which there passes axially with sealing a primary piston 16 the front part of which is in a primary chamber 18 filled with brake fluid and comprising an outlet orifice (not depicted) connected to means of applying the brakes on the wheels of a motor vehicle. The front end of the primary piston 16 has a head 20 which can be moved in translation in a sealed fashion in the chamber 18 and is formed with an axial passage 22 in which there is engaged the axial rod 24 of a valve shutter 26 which is urged backward by a spring 28 into a position in which it closes the passage 22. The front end of the spring 28 rests against the internal surface of a cylindrical duct 30 which is formed at the front end of the primary piston 16, and inside which the valve shutter 26 is housed.

The axial passage 22 opens at its rear end into a supply chamber 32 extending between the head 20 of the piston and the rear wall 14 of the master cylinder 10, this supply chamber 32 being connected by a duct 34 of the body 12 to a counterbore 36 intended, in a sealed fashion, to receive a tubular end piece of a reservoir (not depicted) of brake fluid.

A transverse pin 38 is mounted fixedly in the supply chamber 32 and passes through a slot 40 in the rod of the primary piston 16, this pin 38 limiting the forward movement of the primary piston 16 and forming a rest for the valve shutter rod 24 so that, when the primary piston 16 is in the position of rest depicted in FIG. 1, the valve shutter head 26 is separated from the front end of the passage 22 and allows communication between the primary chamber 18 and the supply chamber 32.

The primary piston 16 is urged toward its position of rest by a return spring 42 which at its front end rests against the rear end of the secondary piston 44 and at its rear end rests against a spring stop 46 which is mounted with clearance on the duct 30 of the primary piston and which at its rear end rests against the piston head 20. The front part of the spring stop 46 has passing through it an axial rod 48 the front end of which is fixed, for example by screwing, to the rear face of the secondary piston 44 and the rear end of which comprises a head 50 for retaining the front end of the spring stop 46. This arrangement allows the length at rest of the primary chamber 18 and the preload on the return spring 42 to be fixed.

Like the primary piston 16, the secondary piston 44 is mounted to slide with sealing in a secondary chamber 52 comprising an outlet (not depicted) connected to the means of actuating the vehicle wheel brakes. The front end of the secondary piston 44 is secured to a cylindrical axial duct 54 surrounding a valve shutter the head 56 of which is intended to seal an axial passage 58 in the secondary piston, which establishes communication between the secondary chamber 52 and a supply chamber 60 connected to a counterbore 62 in the cylindrical body 12 of the master cylinder intended to receive a tubular end piece of the reservoir of brake fluid.

A transverse pin 64 mounted fixedly in the supply chamber 60 passes with clearance through a slot 66 in the secondary piston 44 and forms a stop for the axial rod 68 of the valve shutter 56 to keep this valve shutter in the position in which the axial passage 58 is open when the secondary piston is in its position of rest depicted in FIG. 1.

The valve shutter 56 is urged into the position of closing the passage 58 by a spring 70 the front end of which rests against the internal face of the cylindrical duct 54. A return spring 72 for returning the secondary piston to its position of rest rests at its front end against the front wall 74 of the master cylinder 10 and at its rear end against the secondary piston 44. As a preference, the preload on the spring 72 in the position of rest shown in FIG. 1 is less than that of the primary piston return spring 42.

This master cylinder works as follows:

When the driver of the vehicle presses the brake pedal to brake the vehicle, the force applied to the brake pedal is amplified by a pneumatic brake booster and transmitted to the primary piston 16 of the master cylinder which is moved forward in the direction indicated by the arrow 76 and which moves the secondary piston 44 forward. In the position of rest depicted in FIG. 1, the axial passages 22 and 58 in the primary 16 and secondary 44 pistons are open and the onset of forward movement of the primary 16 and secondary 44 pistons does not cause an increase in pressure in the primary 18 and secondary 52 chambers, the brake fluid contained in the secondary chamber 52 being able to flow toward the supply chamber 66 through the axial passage 58 in the secondary piston 44.

When the secondary piston 44 comes into contact with the valve shutter head 56, the axial passage 58 for communication between the secondary chamber 52 and the supply chamber 66 is sealed closed and the forward movement of the secondary piston then causes an increase in pressure in the secondary chamber 52. The force generated by this increase in pressure begins to compensate for the difference in preload of the springs 42 and 72 then creates a reduction in volume of the primary chamber 18, initially without any increase in pressure in the primary chamber 18 as long as the head of the valve shutter 26 remains distant from the front end of the axial passage 22, then, as this passage becomes sealed closed by the valve shutter head, the relative forward movement of the primary piston 16 causes an increase in pressure in the primary chamber 18.

The increase in pressure in the chambers 18 and 52 is transmitted to the means of applying the vehicle wheel brakes.

When the driver stops pressing on the brake pedal, the pressure of the brake fluid in the chambers 18 and 52 and the return springs 42 and 72 return the primary and secondary pistons 16, 44 to their positions of rest, the valve shutter rods 24 and 68 come back to rest against the pins 28, 64 respectively, communications are once again established between the chambers 18 and 32 and between the chambers 52 and 60, and the various components of the master cylinder return to their positions of rest which are depicted in FIG. 1.

The dead travels of the primary piston 16 and of the secondary piston 44 delay the onset of braking because no pressure rise occurs in the chambers 18 and 52 before the axial passages 22 and 58 are closed by the heads of the valve shutters 26 and 56. These dead travels are dependent on the manufacturing and assembly tolerances of the master cylinders and it is difficult to control them precisely.

The invention proposes to conceal them by using for that means which are simple, effective and inexpensive, comprising additional valve shutters which are mounted on the aforesaid valve shutters 26, 56 and whose function is to reduce the flow of brake fluid through the axial passages 22 in the primary piston 16 and 58 and the secondary piston 44 during the dead travels of these pistons.

The additional valve shutter mounted on the valve shutter 26 of the primary piston 16 comprises a transverse washer 80 which can be moved on an axial rod 82 borne by the valve shutter 26 and extending forward, from the head of the valve shutter, the washer 80 having an outside diameter greater than the inside diameter of the cylindrical duct 30 in the primary piston 16 so as to be able to shut this duct off in a practically sealed fashion. A spring 84 bearing at its front end against a front head 86 of the axial rod 82 and at its rear end against the washer 80 urges the latter into its position for shutting off the duct 30. An orifice 88 passing through the washer 80 allows brake fluid to flow at a reduced rate between the chamber 18 and the inside of the duct 30 when the washer 80 of the additional valve shutter is in the position for shutting of this duct.

Likewise, the valve shutter 56 of the secondary piston 44 is equipped with an additional valve shutter, advantageously identical to that of the valve shutter of the primary piston, this additional valve shutter comprising another washer 80 which can move along an axial rod 90 extending forward from the head of the valve shutter 56 and urged by a spring 92 to shut off in a practically sealed fashion the front end of the cylindrical duct 54 in the secondary piston 44. The spring 92 bears at its front end against a front head 94 of the axial rod 90 and at its rear end against the washer 80. This washer has a through-orifice 88 which allows brake fluid to flow at a reduced rate from the secondary chamber 52 into the duct 54.

These additional valve shutters operate as follows:

In the position of rest depicted in FIG. 1, the washers 80 of the additional valve shutters close off the ducts 30 in the primary piston 16 and 54 in secondary piston 44 in a practically sealed fashion. As already described, the heads of the valve shutters 26 and 56 remain away from the front ends of the axial passages 22 and 58 of the primary piston and of the secondary piston respectively. When the driver presses the brake pedal and the primary and secondary pistons being their forward movement and cover the start of their dead travel, the forced delivery of brake fluid through the through-orifice 88 in the washer 80 results in an increase in pressure in the secondary chamber 52 right from the start of forward movement of the primary and secondary positions starting from their position of rest. The increase in pressure in the chamber 52 causes a reduction in the volume of the primary chamber 18, and this results in an increase in pressure in the primary chamber 18, because of the shutting-off of the duct 30 by the washer 80 of the additional 80 borne by the valve shutter 26.

In the braking position depicted in FIG. 3, the axial passage 22 of the head of the primary piston is shut off by the head of the valve shutter 26 and the duct 30 containing this valve shutter head remains shut off by the washer 80 of the additional valve shutter.

When the motor vehicle is equipped with a circuit of the ESP type, the operation of this circuit requires the supplying of a pump with brake fluid supplied via the outlet from the master cylinder 10. This supply gives rise to a depression in the primary 18 and secondary 52 chambers of the master cylinder and to the opening of the additional valve shutters and of the valve shutters 26 of the primary piston and 56 of the secondary piston as depicted schematically in FIG. 4 in the case of the primary piston, this opening allowing the pump of the ESP circuit to be supplied with brake fluid from the reservoir connected to the master cylinder 10.

The washers 80 of the additional valve shutters are made of a rigid material, for example a metal or plastic resistant to brake fluid. The pressures experienced by the additional valve shutters are relatively low and limited to the pressures developed in the chambers 18 and 52 during the dead travels of the primary and secondary pistons, these pressures being, for example, of the order of 10 bar at most. The holes 88 in the washers 80 allow brake fluid to flow from the chambers 18 and 52 toward the reservoir in the event of thermal expansion of the brake fluid. For example, the diameters of these holes are between about 0.4 and 0.6 mm and may vary according to the clearances between the washers 80 and the axial rods 82, 90 on which these washers can move axially.

What is claimed is:

1. A hydraulic master cylinder motor vehicle braking circuit, comprising least one piston (16, 44) that moves axially in a working chamber (18, 52) and is formed within an axial passage (22, 58) for communication between said working chamber (18, 52) and a brake fluid supply chamber (32, 60), and a valve shutter (26, 56) urged by a spring (28, 70) to close said passage when the piston (16, 44) has covered a dead travel in said working chamber (18, 52) starting from a position of rest, characterized by means (80) of concealing the aforesaid dead travel making it possible to reduce the flow of fluid through the aforesaid axial passage (22, 58) to increase the pressure in the working chamber (18, 52) during the dead travel of the piston, said means (80) being borne by the valve shutter (26, 56).

2. The master cylinder according claim 1, characterized in that the means (80) of concealing the dead travel includes an additional valve shutter urged by a spring (84, 92) into a position in which it closes a duct (30, 54) in the end of the piston (16, 44), said additional valve shutter comprising means (88) allowing a reduced flow of fluid in said duct (30, 54) when the latter is closed off by the additional valve shutter.

3. The master cylinder according claim 2, characterized that said additional valve shutter has at least one through-orifice for the reduced flow of fluid.

4. The master cylinder according to claim 3, characterized in that the valve shutter (26, 56) for closing the axial passage (22, 58) in the piston (16, 44) is housed inside the end duct (30, 54) of said piston.

5. The master cylinder according to claim 2, characterized in that the additional valve shutter comprises a washer which can be moved on an axial rod (82) secured to the valve shutter (26, 56) for closing the axial passage (22, 58) in the piston (16, 44).

6. A master cylinder comprising a primary piston (16) and a secondary piston (44) which are able to move respectively in a primary chamber (18) and in a secondary chamber (52) to supply primary and secondary braking circuits, valve shutters (26, 56) borne by the primary and secondary pistons and urged by springs (28, 70) to close axial passages in the primary and secondary pistons which connect the primary and secondary chambers (18, 52) to brake fluid supply chambers (32, 60), characterized in that it comprises means (80) for concealing the dead travels of the primary (16) and secondary (44) pistons making it possible to reduce the flow of fluid through the axial passages (22, 58) in these pistons so as to increase the pressure in the primary (18) and secondary (52) chambers, said means being borne by the valve shutters (26, 56) of said pistons.

7. The master cylinder according to one of claim 6, characterized in that said means (80) is made of a rigid material, for example of a metal or plastic resistant to brake fluid.

8. The master cylinder according to one of claim 7, characterized by a through-orifice (88) in the means (80) having a diameter of between about 0.4 and 0.6 mm.

9. The master cylinder according claim 8, characterized in that the means (80) of concealing the dead travels of the primary and secondary pistons are identical.

\* \* \* \* \*